UNITED STATES PATENT OFFICE.

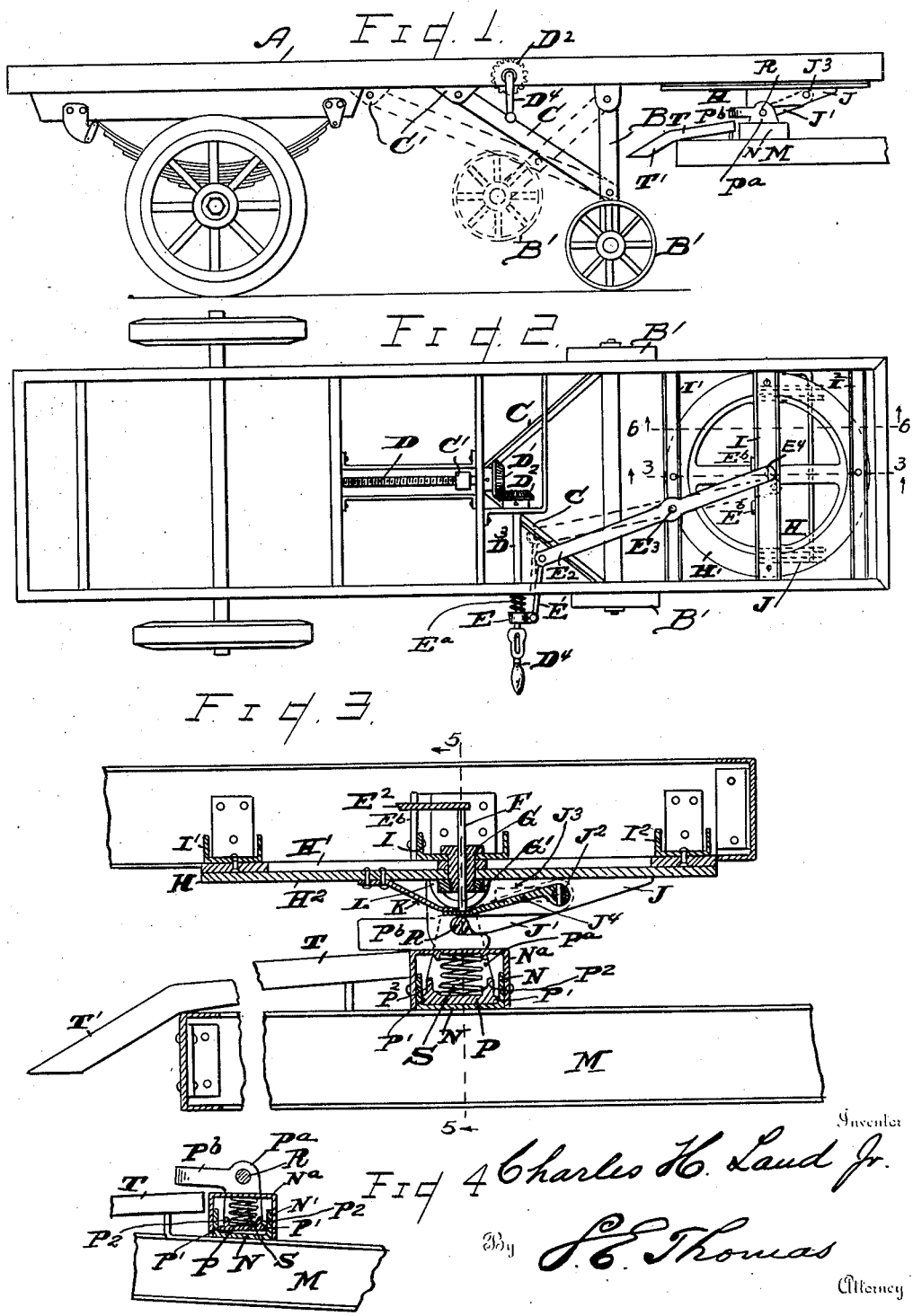

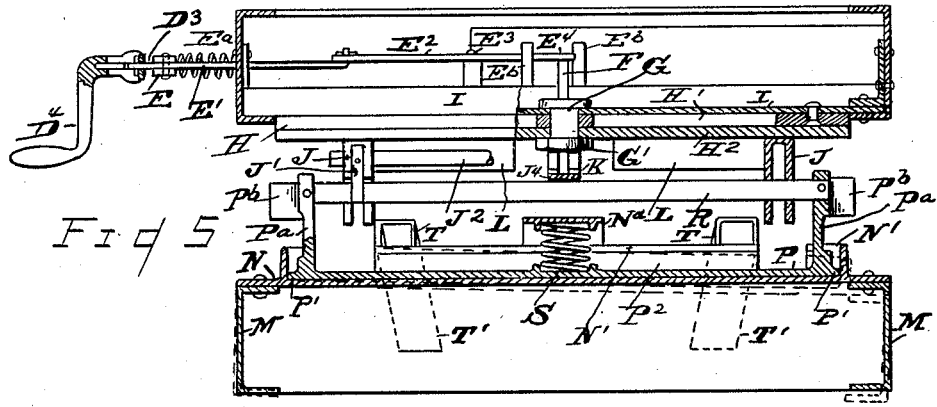
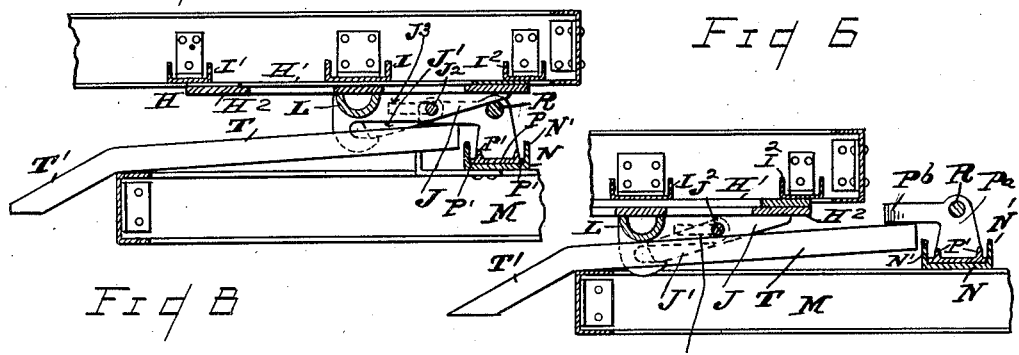
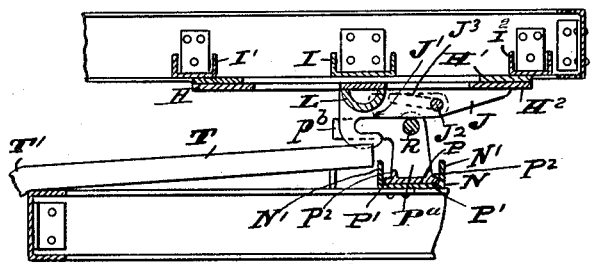
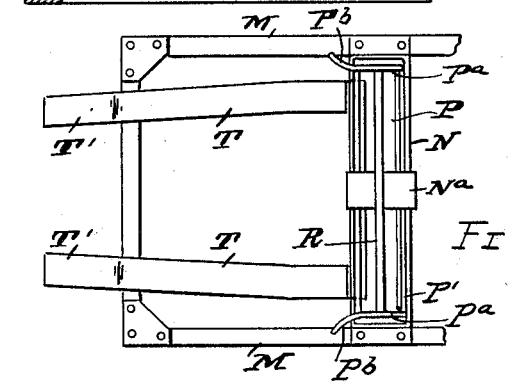

CHARLES H. LAND, JR., OF DETROIT, MICHIGAN, ASSIGNOR OF ONE-HALF TO WILLIAM H. WILSON, OF DETROIT, MICHIGAN.

TRACTOR AND TRAILER COUPLING MECHANISM.

1,408,101.   Specification of Letters Patent.   Patented Feb. 28, 1922.

Application filed May 14, 1921. Serial No. 469,700.

*To all whom it may concern:*

Be it known that I, CHARLES H. LAND, Jr., citizen of the United States, residing at Detroit, county of Wayne, State of Michigan, have invented a certain new and useful Improvement in Tractor and Trailer Coupling Mechanism, and declare the following to be a full, clear, and exact description of the same, such as will enable others skilled in the art to which it pertains to make and use the same, reference being had to the accompanying drawings, which form a part of this specification.

My invention relates to means for effecting the automatic coupling together of tractors and trailers.

The invention comprises an improved fifth wheel construction to be carried by the trailer adapted to co-operate with a draw-bar mechanism carried by the tractor, the parts being so constructed and arranged that a lateral as well as "fore and aft" rocking action may be obtained between the tractor and trailer to relieve the parts of any undue strain occasioned through inequalities of the road surface over which the vehicles travel.

A further object is to provide a coupling and locking mechanism operative throughout a wide range of positions.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a side elevation of a trailer and the fragmentary rear end of a tractor coupled together showing the usual supporting leg of the trailer in full lines and in dotted lines the position of the latter when the forward end of the trailer is supported by the tractor.

Figure 2 is a plan view of the trailer.

Figure 3 is a fragmentary longitudinal sectional view through the fifth wheel and frame of the trailer taken on or about line 3—3 of Figure 2.

Figure 4 is a detail cross sectional view taken on or about line 5—5 of Figure 3 showing the relative position of the draw bar supporting mechanism to the side members of the tractor frame when tilted as a result of inequalities of the road surface.

Figure 5 is a cross sectional view through the frames of the tractor and trailer, taken on or about line 5—5 of Figure 3,—with parts broken away and in elevation.

Figure 6 is a fragmentary longitudinal vertical sectional view through the tractor and trailer frames, showing the slide members of the trailer, resting upon the guide bars of the tractor, as when the tractor is backing into position to receive the forward end of the trailer.

Figure 7 is a similar sectional view showing the draw bar entering upon the inclined side walls of the locking latch members, showing also the slide members slightly raised from the guide bars.

Figure 8 is a like sectional view showing the draw bar about to enter the engaging hooks carried by the fifth wheel of the trailer, the latch being automatically raised by the upward thrust of the draw bar, the latter being shown in the position immediately preceding its engagement with the hook of the fifth wheel member, and prior to the latch dropping to secure the draw bar in locked relation with the hook members.

Figure 9 is a fragmentary plan view of the end of the tractor frame showing the guide bars, and the tilting draw bar carried by the tractor frame.

Referring now to the letters of reference placed upon the drawings:

A, denotes a trailer provided with a swinging supporting leg B fitted at its lower end with the usual supporting wheel B'. C, C, are links pivoted to the swinging leg B and to a traveling block C' mounted on the screw shaft D journaled in the trailer frame. D' is a bevel gear secured to one end of the screw shaft in mesh with a like bevel gear $D^2$, on a shaft $D^3$, journaled in the trailer frame. $D^4$, is a crank lever longitudinally slidable upon the shaft $D^3$, for manually operating the shaft to actuate the gears $D^2$ and thereby raise or lower the supporting leg. E, is a sleeve loosely mounted on the shaft $D^3$, connected by a link E' with a swinging arm $E^2$ pivoted at $E^3$ to the frame of the trailer. $E^a$ is a spring mounted on the shaft $D^3$ between the sleeve and side sill of the trailer frame. The free end $E^4$ of the arm is designed to close over a pin F, projecting through a king-bolt G extending through the members H' and H² of a fifth wheel H, mounted upon the underside of the trailer frame through the action of the spring E^a. E^b E^b are stops to limit the movement of the swinging arm E². The king-bolt is fitted with a nut G' to connect the members H and H' of the fifth wheel together. I, is a laterally disposed channel iron bolted to the side sills of the trailer frame through which the king-bolt G extends. I' and I² are other channel irons bolted to the side sills of the trailer frame to which the member H' of the fifth wheel is bolted. Bolted to each side of the rotatable fifth wheel member H² are hook shaped inclined pedestals J of channel like form in cross section. J' J' are rocking latches respectively housed between the channel walls of the pedestals and rigidly secured to a transverse shaft J² journaled in the walls of the latter. Secured to the end of the shaft J² is a handle J³ for manually lifting the latches. J⁴ is an extension arm bolted to the center of the shaft J² the free end of which is overlapped by a spring K bolted to the fifth wheel member H² adapted in conjunction with the pin F to normally maintain the latches J' J' in locked position. L, indicates a divided slide-bar bolted to the lower rotatable fifth wheel member H²;—the bar being divided at the hub of the fifth wheel to accommodate the king-bolt and nut. M denotes the side sills of a tractor frame. N, is a transversely disposed casting formed with an uptanding flange N' and bolted to the side sills of the tractor frame. N^a is a bridge member of channel-like form in cross-section bolted at the middle of the casting to the upstanding flanges N' of the latter. P, denotes a casting fitting loosely between the walls of the casting N, having a projecting bead P', around its outer edge to provide a clearance between the flange N' of the casting N, and the flange P² of the casting P. Projecting upwardly from the ends of the casting P are brackets P^a provided with flaring extension arms P^b to serve as guides for the latch members when backing the tractor into position to couple with the trailer. R, is a transverse coupling bar supported in the brackets P^a. S, is a spring fitted at one end in a socket formed in the bridge member N^a and at the other end in a like socket formed in the casting P. T, are inclined guides bolted to the tractor frame their outwardly projecting ends T' being inclined toward each other (see Figure 9) and downwardly at a relatively greater angle beyond the end of the tractor frame (see Figure 6).

Having indicated the several parts by reference letters the construction and operation of the device will be readily understood.

When about to effect the coupling of the tractor to the trailer the fifth wheel member H² is approximately adjusted to the line of approach of the tractor toward the trailer. Upon backing into coupling position the inside edges of the inclined latch pedestals J first come in contact with the outside edges of the guides T;—which as before explained are inclined downwardly and toward each other beyond the end of the tractor frame. A further movement of the tractor causes the divided slide bar L to ride upwardly upon the face of the guides T, T, thus gradually raising the end of the trailer until the inclined outer end of the latch pedestals J pass under the transverse coupling bar R.

The slide bar L and tractor is thereby lifted from the guides T and upon further backing of the tractor the transverse coupling bar R forces the rocking latches J' J' upwardly against the action of the spring K until the bar enters the hooked-shaped end of the pedestals, whereupon the latches are released and returned to their former position through the action of the spring K;— thus securing the coupling bar R of the tractor in locked relation with the inclined hook-shaped pedestals on the fifth wheel member H² of the trailer.

Attention is particularly directed to the fact that by lifting the trailer from contact with the guides T the trailer is free to rock laterally upon the spring S, located directly below the king-bolt and also upon the transverse coupling bar R upon which it rests.

As a result of the tipping action of the casting P shocks occasioned through the starting or stopping of the vehicle, or when going over a rough road or obstruction are absorbed by the spring S, the movement of the casting upon its beaded edge P' causing the compression of the spring.

Having thus described my invention what I claim is:—

1. In a device of the character described, the combination with a tractor and a trailer, of a rectangular member bolted to the tractor frame having upstanding walls forming a pocket, a casting housed in said pocket adapted to rock therein, a coupling bar supported by brackets extending upwardly from the ends of the casting, an inverted channel like bridge member bolted centrally to the walls of the rectangular member, a spring located between the bridge member and casting, a fifth wheel carried by the trailer, a transverse slide bar carried by the lower member of the fifth wheel, means carried by the fifth wheel adapted to automatically engage the transverse coupling bar, and guide members carried by the tractor adapted to receive the slide bar, whereby said means carried by the fifth wheel may be guided into engagement with the transverse coupling bar.

2. In a device of the character described, the combination with a tractor and a trailer, of a fifth wheel carried by the trailer comprising an upper member bolted to the trailer and a lower rotatable member pivotally connected to the upper member by a king-bolt, inclined latch pedestals secured to the lower member of the fifth wheel, swinging latches supported in said latch pedestals, a shaft journaled in the wall of the pedestals to which said latches are secured, an extension arm secured to said shaft projecting beneath the king-bolt, a spring adapted to bear against said arm to yieldingly maintain the latches in locked relation, a movable pin extending through the king-bolt adapted to bear upon the extension arm, means adapted to close over said pin whereby the latches are held in locked position, and means carried by the tractor including a transverse coupling bar adapted to be engaged by the latch pedestals to couple the tractor and trailer together.

3. In a device of the character described, the combination with a tractor and a trailer, of a fifth wheel carried by the trailer comprising an upper member bolted to the trailer and a lower rotatable member pivotally connected to the upper member by a king-bolt, inclined latch pedestals secured to the lower member of the fifth wheel, swinging latches supported in said latch pedestals, a shaft journaled in the wall of the pedestals to which said latches are secured, an extension arm secured to said shaft projecting beneath the king-bolt, a spring adapted to bear against said arm to yieldingly maintain the latches in locked relation, a movable pin extending through the king-bolt adapted to bear upon the extension arm, a swinging arm adapted to close over said pin, whereby the latches are held in locked position, means for shifting said swinging arm to release said pin, means carried by the tractor including a transverse coupling bar adapted to be engaged by the latch pedestals to couple the tractor and trailer together, and means for guiding the latch pedestals into locked relation with the transverse coupling bar.

4. In a device of the character described, the combination with a tractor and a trailer, of a rectangular member bolted to the tractor frame having an upstanding flange forming a pocket, a casting housed in said pocket adapted to rock therein, a coupling bar supported by brackets extending upwardly from the ends of the casting, a bridge member bolted centrally to the flanges of the rectangular member, a spring located between the bridge member and the casting, a fifth wheel carried by the trailer, inclined hooked-shaped latch pedestals carried by the lower member of the fifth wheel, spring actuated latches mounted in said latch pedestals to secure the coupling bar when engaged by the hooked-shaped pedestals, means for actuating said latches to release the bar and suitable guide members carried by the tractor adapted to guide the pedestal latches of the trailer into locked relation with the coupling bar of the tractor.

5. In a device of the character described, the combination of a tractor and a trailer, of a rectangular member bolted to the tractor frame having upstanding walls forming a pocket, a casting housed in said pocket provided with side flanges and a bracket wall at each end having flaring extension guide arms and with a flange or bead projecting from each side of the casting to maintain the flanges of the casting in spaced relation to the walls of the rectangular member, a coupling bar supported in the end of the brackets of the casting, an inverted channel-like bridge member bolted centrally to the flanges of the rectangular member, a spring located between the bridge member and the casting, a fifth wheel carried by the trailer, a transverse slide member carried by the lower member of the fifth wheel, hooked-shaped inclined latch pedestals carried by the said last named fifth wheel member, spring actuated latches mounted in said pedestals to secure the coupling bar, and suitable guide members carried by the tractor frame adapted to receive the slide member of the fifth wheel whereby the hooked-shaped inclined pedestals of the trailer may be guided into locked relation with the coupling bar of the tractor that the coupling bar may co-operate with the inclined latch pedestals to lift the slide member of the fifth wheel of the trailer from the guide members of the tractor thereby permitting a tilting action between tractor and trailer.

6. In a device of the character described, the combination of a tractor and a trailer, of a fifth wheel carried by the trailer comprising an upper element bolted to the trailer and a lower rotatable element pivotally connected to the upper element of the fifth wheel by a king-bolt; a rock shaft journaled in members secured to the lower element of the fifth wheel; swinging latch members secured to the rock shaft, an extension arm also secured to the rock shaft; a coupling bar carried by the tractor adapted to be engaged by the latch members; spring actuated means adapted to bear upon the extension arm to close the latch members; a movable pin adapted to bear upon said extension arm, and means adapted to close over said pin to lock the latch members when closed.

7. In a device of the character described, the combination of a tractor and a trailer, of a fifth wheel carried by the trailer comprising an upper member bolted to the trailer and a lower rotatable member pivotally connected to the upper member by a king-bolt; swinging latch members adapted to engage a coupling bar, secured to the rock shaft journaled in members carried by the lower member of the fifth wheel; an extension arm secured to the rock shaft; a coupling bar; yielding supporting means for said coupling bar carried by the tractor; a movable pin extending through the king-bolt adapted to engage the extension arm of the rock shaft; a swinging arm adapted to close over the movable pin to secure the swinging latch members; means for shifting said swinging arm and means for limiting the movement of the arm in either direction.

8. In a device of the character described, the combination of a tractor and a trailer, of a fifth wheel carried by the trailer comprising an upper member bolted to the trailer and a lower member pivotally connected to the upper member by a king-bolt; a pair of inclined hooked-shaped latch pedestals respectively carried by the lower fifth wheel member on opposite sides of the king-bolt, adapted to engage a coupling bar carried by the tractor; a transverse rock shaft journaled in the walls of the inclined pedestals fitted with latches adapted to secure the coupling bar in the latch pedestals, an arm secured to the rock shaft and extending below the king-bolt; a spring adapted to bear upon the arm to close the latches; a movable pin extending through the king-bolt adapted also to bear upon the arm; a swinging arm adapted to close over the pin to secure the latches in locked position; a supporting leg for the trailer, means for raising and lowering the supporting leg and manually operated means connected with said leg raising and lowering means and with said swinging arm, whereby the latches engaging the coupling bar are automatically locked following the raising of the supporting leg.

In testimony whereof, I sign this specification in the presence of two witnesses.

CHARLES H. LAND, Jr.

Witnesses:
S. E. THOMAS,
JOHN CONSIDINE.